No. 750,092. PATENTED JAN. 19, 1904.
J. B. CORNWALL.
FEEDER FOR GRAIN SEPARATORS.
APPLICATION FILED SEPT. 15, 1903.
NO MODEL.
Fig. 1.
Fig. 2.
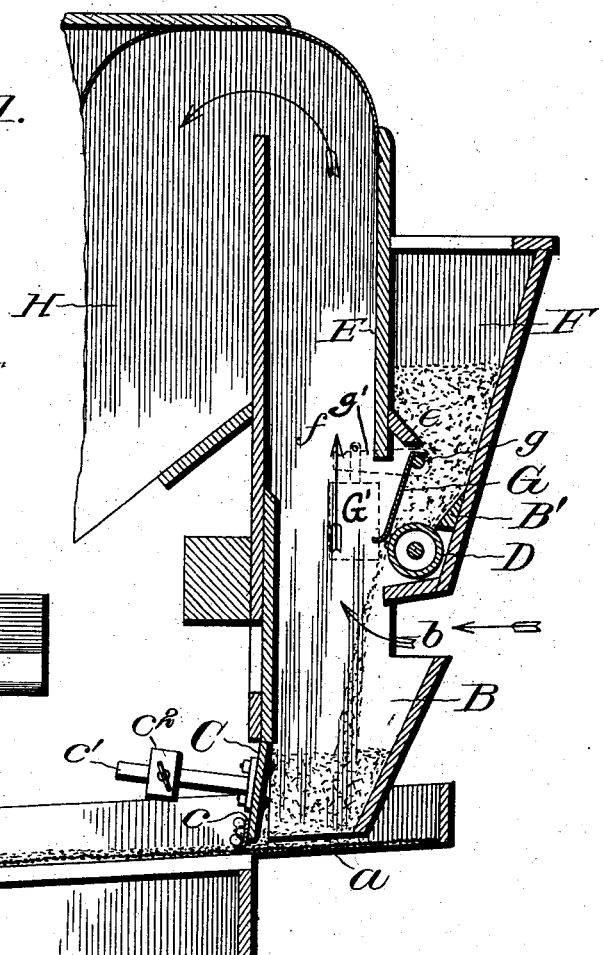
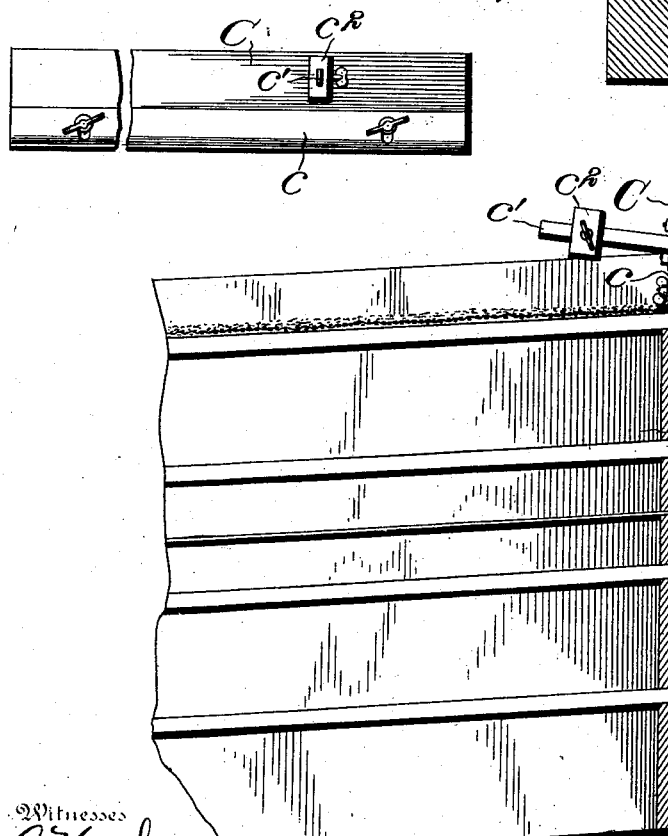
Witnesses
C. H. Walker.
James R. Mansfield.
Inventor
John B. Cornwall.
By Alexander & Dowell.
Attorneys.

No. 750,092.

Patented January 19, 1904.

UNITED STATES PATENT OFFICE.

JOHN B. CORNWALL, OF MOLINE, ILLINOIS, ASSIGNOR TO THE BARNARD AND LEAS MANUFACTURING COMPANY, OF MOLINE, ILLINOIS.

FEEDER FOR GRAIN-SEPARATORS.

SPECIFICATION forming part of Letters Patent No. 750,092, dated January 19, 1904.

Application filed September 15, 1903. Serial No. 173,272. (No model.)

*To all whom it may concern:*

Be it known that I, JOHN B. CORNWALL, of Moline, in the county of Rock Island and State of Illinois, have invented certain new and useful Improvements in Feeders for Grain-Separators; and I hereby declare that the following is a full, clear, and exact description thereof, reference being had to the accompanying drawings, which form part of this specification.

This invention is an improvement in feeders for grain-separators; and its object is to produce a uniform evenly-distributed flow of grain entirely across the width of the screens, so as to obtain the greatest efficiency of the machine and the largest output therefrom.

The invention consists in combining a roller-feed with a shake-feed, the former delivering to the latter and the latter to the shoe and the grain being subjected to an air separation between the two feeders. While the specific construction of the roller-feeder and of the shake-feeder separately considered is old and is not claimed herein, the particular combination thereof producing important practical results is novel, and the invention therefore resides in the combination and arrangement of parts, as hereinafter described and claimed.

In the accompanying drawings, Figure 1 is a vertical section through the feeder as applied to a vibrating-screen grain-separator. Fig. 2 is a detail view of the lower valve.

A designates part of the shaking screen-shoe of a grain-separator, which is ordinarily formed with a series of superimposed screens. As shown, the uppermost screen projects beyond the end of the shoe and beneath the feed-hopper B, the lower end of which is open, but is practically closed by the screen $a$. At the inner side and lower end of the hopper B is a weighted feed-valve C, extending across and above the screen $a$ and provided with a vertically-adjustable regulating-strip $c$, having vertical slots transfixed by bolts on the valve and fastened by thumb-screws on the bolts, as usual. This strip can be adjusted vertically to regulate the depth of the stream of grain passing out of the hopper. The adjustable weight $c^2$ on the arm $c'$, attached to the valve C, automatically regulates the flow of grain also in the well-known manner.

Within the hopper B above the valve C is a feed-roller D, which controls the flow of grain through the hopper, it being located below a shunt-board B', attached to the outer side of the hopper, and an inner shunt-board $e$, attached to the lower end of a partition E, located in the upper part of the hopper and dividing the upper part thereof into a grain-chamber F and an air flue or trunk $f$. A hinged valve G is hung on a rod $g$ below the shunt-board $e$ and bears against the roller D at its lower edge, said valve being pressed toward the roller by a weight G', hung on an arm $g'$ on the outer end of the rod $g$, as indicated in the drawings, and automatically regulating the flow of grain in the usual manner.

Below the feed-roller D an air-inlet opening $b$ is made in the front wall of the hopper, through which a current of air is drawn and passes through the grain falling from roller D up to the flue $f$ and through the latter to the settling-chamber H and to the fan. (Not shown.)

The operation of the feeder is as follows: Grain is spouted into chamber F in the upper part of hopper B. The roll D being driven by any suitable means (not shown, because well known) feeds the grain down to the lower part of hopper and past opening $b$ in a substantially uniform stream, distributing the grain so that it will be properly subjected to the action of the air separating-current entering the hopper through opening $b$. The grain falling to the bottom of the hopper rests directly upon the screen $a$ or top of shoe A, and the latter being vibrated in the usual manner (not shown) the grain escapes under valve C in a thin uniform stream the full width of the screen-shoe, and the full capacity of the separator is obtained. The roller-feeder is so timed relatively to the shaking-feeder that it will maintain in the latter sufficient grain to insure a uniform feed therefrom without permitting the latter to choke or feed unevenly, as it might do if the grain were spouted directly to the shaking-feeder or if the grain were fed direct from the roller-feeder onto the screen.

By combining the two feeders with interposed air separation I obtain a more uniform feed of grain, reduce wear on the screen-shoe, can more nicely and accurately regulate the flow of grain, can obtain a uniform flow of grain the width of the screen-shoe, can obtain an air separation of the grain before it is delivered onto the screen without having the feed of grain to the screen disturbed or deranged.

Having thus described my invention, what I therefore claim as new, and desire to secure by Letters Patent thereon, is—

1. In combination with the screen-shoe, a feed-hopper having its lower end closed by said shoe, a regulating-valve at the inner side and lower end of the hopper, and a roller-feeder in the hopper above the said valve, substantially as and for the purpose described.

2. The combination of a vibrating screen, a hopper having its lower end closed by said screen; a regulating-valve at the inner side and lower end of the hopper; a roller-feeder in the hopper above the valve, and an inlet for an air separating-current in the front of the hopper below the roller-feeder, substantially as described.

3. In a grain-separator the combination of a shaking-shoe, a feed-hopper having a shake-feed at its lower end, a roller-feed above the shake-feed, and a separating air-current inlet whereby the grain is subjected to the action of an air-blast between the two feeds for the purpose and substantially as described.

4. In a grain-separator, the combination with the shaking-shoe; a feed-hopper above the same having its lower end closed by the upper part of said shoe; a feed-regulating valve on the lower end and inner side of the hopper; an inlet for an air separating-current in the front side of the hopper above the shoe; a feed-roller in the hopper above said air-inlet; a swinging valve coacting with said roller; and a partition in the hopper above said roller separating the upper part of the hopper into a grain-chamber, and an air-passage, all substantially as and for the purpose described.

In testimony that I claim the foregoing as my own I affix my signature in presence of two witnesses.

JOHN B. CORNWALL.

In presence of—
STEPHEN D. RAY,
E. R. SAMUELSON.